(12) United States Patent  (10) Patent No.: US 9,004,582 B2
Jojiki et al.  (45) Date of Patent: Apr. 14, 2015

(54) FLOOR STRUCTURE OF VEHICLE BODY CENTER SECTION

(71) Applicant: Suzuki Motor Corporation, Shizuoka-ken (JP)

(72) Inventors: Kentaro Jojiki, Shizuoka-ken (JP); Yu Hashiba, Shizuoka-ken (JP); Keisuke Kawai, Shizuoka-ken (JP)

(73) Assignee: Suzuki Motor Corporation (JP)

( * ) Notice: Subject to any disclaimer, the term of this patent is extended or adjusted under 35 U.S.C. 154(b) by 55 days.

(21) Appl. No.: 13/910,411

(22) Filed: Jun. 5, 2013

(65) Prior Publication Data

US 2013/0328353 A1  Dec. 12, 2013

(30) Foreign Application Priority Data

Jun. 6, 2012 (JP) .................................. 2012-128971

(51) Int. Cl.
*B62D 25/20* (2006.01)
*B60N 2/30* (2006.01)

(52) U.S. Cl.
CPC ................ *B62D 25/20* (2013.01); *B60N 2/305* (2013.01); *B60N 2/3065* (2013.01)

(58) Field of Classification Search
USPC ..................... 296/65.05, 187.08, 193.07, 204
See application file for complete search history.

(56) References Cited

U.S. PATENT DOCUMENTS

| | | | | |
|---|---|---|---|---|
| 6,039,386 | A * | 3/2000 | Hasshi et al. ............ | 296/203.01 |
| 6,293,603 | B1 * | 9/2001 | Waku et al. ................ | 296/65.09 |
| 6,382,491 | B1 * | 5/2002 | Hauser et al. ............. | 296/65.05 |
| 6,601,900 | B1 * | 8/2003 | Seibold ...................... | 296/65.09 |
| 6,997,498 | B2 * | 2/2006 | Oyama ....................... | 296/65.05 |
| 7,118,167 | B2 * | 10/2006 | Nakamura et al. ......... | 296/193.07 |
| 7,255,384 | B2 * | 8/2007 | Saberan et al. ............ | 296/65.09 |
| 7,407,223 | B2 * | 8/2008 | Ito et al. .................... | 296/193.07 |
| 7,434,871 | B2 * | 10/2008 | Mizuma et al. ........... | 296/193.07 |
| 7,516,999 | B2 * | 4/2009 | Toyota ....................... | 296/65.13 |
| 7,635,158 | B2 * | 12/2009 | Park .......................... | 296/203.04 |
| 8,398,158 | B2 * | 3/2013 | Mildner et al. ........... | 296/193.07 |
| 8,439,430 | B2 * | 5/2013 | Sato et al. ................. | 296/203.02 |
| 8,579,351 | B2 * | 11/2013 | Takakura et al. .......... | 296/65.05 |
| 8,616,624 | B2 * | 12/2013 | Yamada et al. ................. | 297/14 |
| 8,636,093 | B2 * | 1/2014 | Sotoyama et al. ............ | 180/69.1 |
| 8,668,248 | B2 * | 3/2014 | Ishizono et al. ......... | 296/187.08 |
| 8,820,819 | B2 * | 9/2014 | Tamaki ..................... | 296/193.07 |
| 2008/0238152 | A1 * | 10/2008 | Konishi et al. ................. | 296/204 |
| 2010/0140977 | A1 * | 6/2010 | Mori ......................... | 296/193.07 |
| 2013/0328353 | A1 * | 12/2013 | Jojiki et al. .............. | 296/193.07 |
| 2014/0203595 | A1 * | 7/2014 | Mochizuki ............... | 296/193.07 |

FOREIGN PATENT DOCUMENTS

JP  2011-173507  9/2011

* cited by examiner

*Primary Examiner* — Gregory Blankenship
(74) *Attorney, Agent, or Firm* — Lerner, David, Littenberg, Krumholz & Mentlik, LLP

(57) ABSTRACT

In a floor structure of a vehicle body center section, a floor side member is provided at lower portions of a main floor panel, a vertical wall is formed at a front side of a rear floor panel, a rear seat is installed on the rear floor panel, a rear seat leg extends downward along the vertical wall, a lower end portion of the rear seat leg is mounted to a portion of the rear floor panel, a rear seat leg reinforcement member that extends in a vehicle longitudinal direction is disposed on each of upper portions at both left and right sides of the floor panels, a rear end portion of the reinforcement member is connected to the lower end portion of the rear seat leg, and a front end portion of the reinforcement member is connected to the main floor panel and the floor side member.

8 Claims, 4 Drawing Sheets

FLOOR STRUCTURE OF VEHICLE BODY CENTER SECTION

CROSS-REFERENCE TO RELATED APPLICATIONS

The present application claims priority from JP 2012-128971 filed in the Japanese Patent Office on Jun. 6, 2012, the disclosure of which is hereby incorporated herein by reference.

BACKGROUND OF THE INVENTION

The present invention relates to a floor structure of a vehicle body center section to which a rear seat is mounted.

Conventionally, a floor structure of a vehicle body center section in a vehicle such as an automobile includes a main floor panel and a rear floor panel that are provided along a vehicle longitudinal direction, and a front portion of the rear floor panel is joined to a rear portion of the main floor panel. At a front side of the rear floor panel, a vertical wall that extends upward is formed, and on an upper portion of the rear floor panel located at a rear side of the vertical wall, a rear seat is installed. Furthermore, a fuel tank is disposed in a lower side of the rear floor panel that is located at the rear side of the vertical wall. Therefore, the rear floor panel has an open section structure.

In the floor structure as above, the rear seat is provided with a rear seat leg that extends downward along the vertical wall of the rear floor panel from a lower portion of a front side, and the rear seat is mounted on a top surface of the rear floor panel by fastening a lower end portion of the rear seat leg to a bottom portion of the front side of the rear floor panel (refer to, for example, Patent Literature 1).

However, in the conventional floor structure of the vehicle body center section described above, the rear floor panel is of an open section structure, and the rigidity of the front side portion of the rear floor panel is insufficient. Therefore, when the rear seat is displaced toward the vehicle front side by an impact load from the vehicle front side, the load that is exerted on the upper portion of the rear seat becomes a moment, the rear floor panel located at the mounting portion of the rear seat leg is locally deformed, the mounting portion of the rear seat leg rotates toward the vehicle front side and cannot support the rear seat, and thus the rear seat is likely to move to the vehicle front side to a large extent.

SUMMARY OF THE INVENTION

The present invention has been made in the light of the circumstances as above, and an object of the present invention is to provide a floor structure of a vehicle body center section that can efficiently absorb and diffuse a load when the load exerted on the upper portion of the rear seat becomes a moment and is transmitted to a mounting portion of a rear seat leg by enhancing rigidity of the mounting portion of the rear seat leg, and is capable of suppressing a local deformation of the rear floor panel that is located at the mounting portion of the rear seat leg and rotation of the mounting portion of the rear seat leg to the vehicle front side, and reducing a moving amount of the rear seat to the vehicle front side.

In order to solve the problem of the above-described conventional art, the present invention is a floor structure of a vehicle body center section including a main floor panel and a rear floor panel that are provided along a vehicle longitudinal direction, in which the rear floor panel is joined to a rear portion of the main floor panel, a floor side member that extends in the vehicle longitudinal direction is provided at each of lower portions at both left and right sides of the main floor panel, a vertical wall that extends upward is formed at a front side of the rear floor panel, a rear seat is installed on an upper portion of the rear floor panel, a rear seat leg extends downward along the vertical wall of the rear floor panel from a lower portion of a front side of the rear seat, and a lower end portion of the rear seat leg is mounted to a bottom portion of the front side of the rear floor panel, wherein a rear seat leg reinforcement member that extends in the vehicle longitudinal direction is disposed on each of upper portions at both left and right sides of the main floor panel and the rear floor panel, a rear end portion of the rear seat leg reinforcement member is connected to the lower end portion of the rear seat leg, and a front end portion of the rear seat leg reinforcement member is connected to the main floor panel and the floor side member.

Furthermore, in the present invention, the lower end portion of the rear seat leg is mounted on a top surface of the rear floor panel via the rear end portion of the rear seat leg reinforcement member and a leg bracket, and the front end portion of the rear seat leg reinforcement member is connected to the main floor panel and the floor side member via a reinforcement member bracket.

Furthermore, in the present invention, a front side portion of the rear floor panel is formed into a shape that draws a curve that curves downward continuously from a lower portion of the vertical wall with a front end portion extending in a horizontal direction toward a vehicle front side, the leg bracket with a bottom surface portion being formed into a curved shape that is along a curved portion of the rear floor panel is disposed on the curved portion of the rear floor panel, and a join spot of the main floor panel and the rear floor panel is located between the leg bracket and the reinforcement member bracket.

In the present invention, a clearance is provided in a vertical space between the rear seat leg reinforcement member, and the main floor panel and the rear floor panel.

Furthermore, in the present invention, a flange portion that extends along the vehicle longitudinal direction, and protrudes upward or downward is provided at a side portion in a vehicle width direction of the rear seat leg reinforcement member.

As described above, the floor structure of a vehicle body center section according to the present invention is a floor structure including the main floor panel and the rear floor panel that are provided along the vehicle longitudinal direction, in which the rear floor panel is joined to the rear portion of the main floor panel, the floor side member that extends in the vehicle longitudinal direction is provided at each of the lower portions at both the left and right sides of the main floor panel, the vertical wall that extends upward is formed at the front side of the rear floor panel, the rear seat is installed on the upper portion of the rear floor panel, the rear seat leg extends downward along the vertical wall of the rear floor panel from the lower portion of the front side of the rear seat, and the lower end portion of the rear seat leg is mounted to the bottom portion of the front side of the rear floor panel, wherein the rear seat leg reinforcement member that extends in the vehicle longitudinal direction are disposed on each of the upper portions at both the left and right sides of the main floor panel and the rear floor panel, the rear end portion of the rear seat leg reinforcement member is connected to the lower end portion of the rear seat leg, and the front end portion of the rear seat leg reinforcement member is connected to the main floor panel and the floor side member. Therefore, the rigidity of the mounting portion of the rear seat leg can be enhanced.

Consequently, according to the floor structure of the present invention, when the load exerted on the upper portion of the rear seat which is generated by the impact from the vehicle front side becomes rising moment and is transmitted to the mounting portion of the rear floor panel via the rear seat leg, the rear seat leg reinforcement member which forms an L-shaped structure together with the mounting portion of the rear seat leg can smoothly transmit the moment to the main floor panel and the floor side member at the vehicle front side. Therefore, the moment can be efficiently absorbed and diffused, the local deformation of the rear floor panel that is located at the mounting portion of the rear seat leg can be reduced, the mounting portion of the rear seat leg can be reliably restrained from rotating to the vehicle front side, and the amount by which the upper portion of the rear seat moves to the vehicle front side can be reduced.

Furthermore, in the present invention, the lower end portion of the rear seat leg is mounted on the top surface of the rear floor panel via the rear end portion of the rear seat leg reinforcement member and the leg bracket, and the front end portion of the rear seat leg reinforcement member is connected to the main floor panel and the floor side member via the reinforcement member bracket. Therefore, the effect of the above-described invention can be further exhibited, and the mounting operation of the rear seat leg and the rear seat leg reinforcement member to the rear floor panel and the main floor panel is facilitated.

Furthermore, in the present invention, the front side portion of the rear floor panel is formed into the shape that draws a curve that curves downward continuously from the lower portion of the vertical wall with the front end portion extending in the horizontal direction toward the vehicle front side, the leg bracket with the bottom surface portion being formed into the curved shape that is along the curved portion of the rear floor panel is disposed on the curved portion of the rear floor panel, and the join spot of the main floor panel and the rear floor panel is located between the leg bracket and the reinforcement member bracket. Therefore, a diagonally downward load which is transmitted to the mounting portion of the rear seat leg can be efficiently converted into a rising moment, and in addition, the rigidity of the floor panel in a periphery of the mounting portion of the rear seat leg can be enhanced.

In the present invention, the clearance is provided in the vertical space between the rear seat leg reinforcement member, and the main floor panel and the rear floor panel. Therefore, even if a rising moment is generated, the load is received at a high position corresponding to the rising amount due to the existence of the rear seat leg reinforcement member with high rigidity which is raised, the load can be dispersed to the main floor panel and the floor side member, and rotation of the mounting portion of the rear seat leg to the vehicle front side can be suppressed.

Furthermore, in the present invention, the flange portion that extends along the vehicle longitudinal direction, and protrudes upward or downward is provided at the side portion in the vehicle width direction of the rear seat leg reinforcement member. Therefore, the rigidity of the rear seat leg reinforcement member is enhanced, deformation of the rear seat leg reinforcement member by the rising moment can be suppressed, and a load diffusion effect by the rear seat leg reinforcement member can be enhanced.

DETAILED DESCRIPTION OF THE INVENTION

Figure 1:
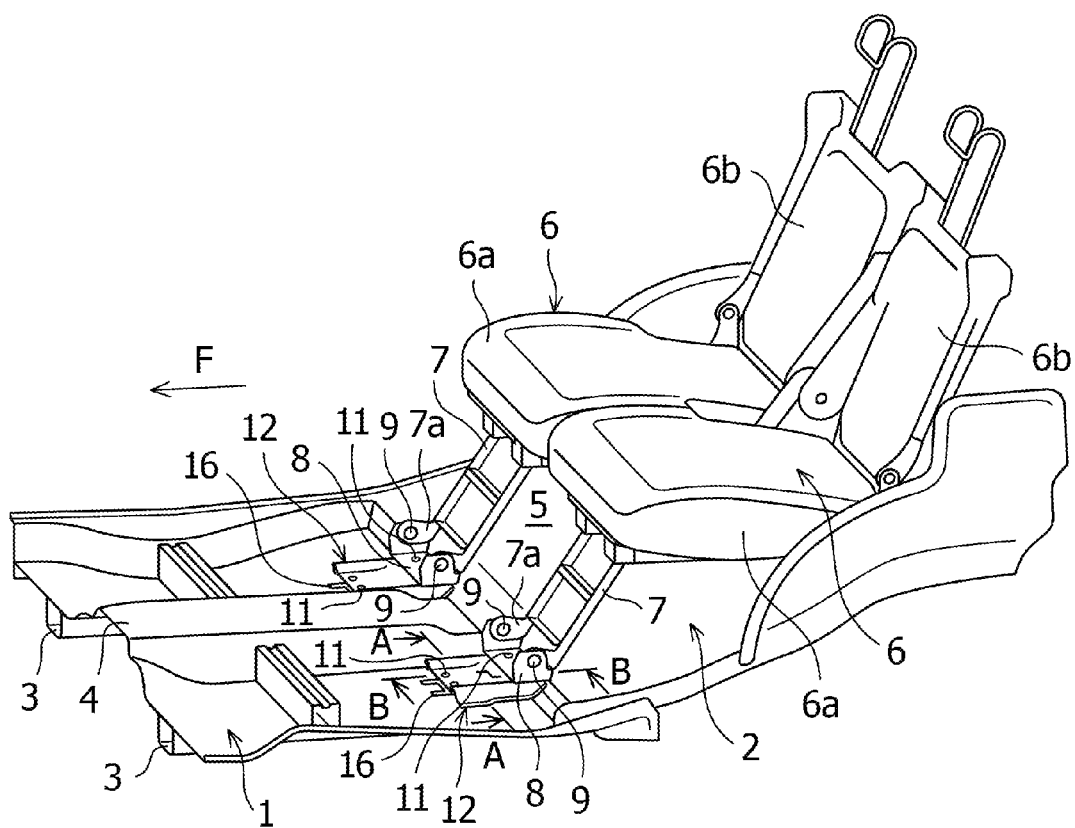
FIG. 1 is a perspective view of a vehicle body center section to which a floor structure according to an embodiment of the present invention is applied, which is seen from above a diagonally front side, and shows a state in which rear seats are mounted on a rear floor panel via rear seat legs.

Hereinafter, the present invention will be described in detail based on an illustrated embodiment.

FIG. 1 to FIG. 4 show a floor structure of a vehicle body center section according to the embodiment of the present invention.

The floor structure of a vehicle body center section of a vehicle according to the embodiment of the present invention includes a main floor panel 1 and a rear floor panel 2 that are provided in a vehicle longitudinal direction, a rear portion of the main floor panel 1 and a front portion of the rear floor panel 2 are joined to each other in a state in which the rear portion and the front portion are overlaid on each other, as shown in FIG. 1 to FIG. 4. At lower portions at both left and right sides in a vehicle width direction of the main floor panel 1, floor side members 3 that are rigid members extending in the vehicle longitudinal direction are respectively provided. These floor side members 3 are formed to be hat-shaped in section, and are fixed by joining upper flanges 3a at both the left and right sides to an undersurface of the main floor panel 1.

In a middle portion in the vehicle width direction of the main floor panel 1, a floor tunnel 4 with a hat-shaped section that protrudes toward an upper side of the vehicle is provided along the vehicle longitudinal direction. Furthermore, at a front side of the rear floor panel 2, a vertical wall 5 extending upward is formed toward a front surface. Note that in FIG. 1 and FIG. 2, an arrow F direction indicates a vehicle front side.

Figure 2A:
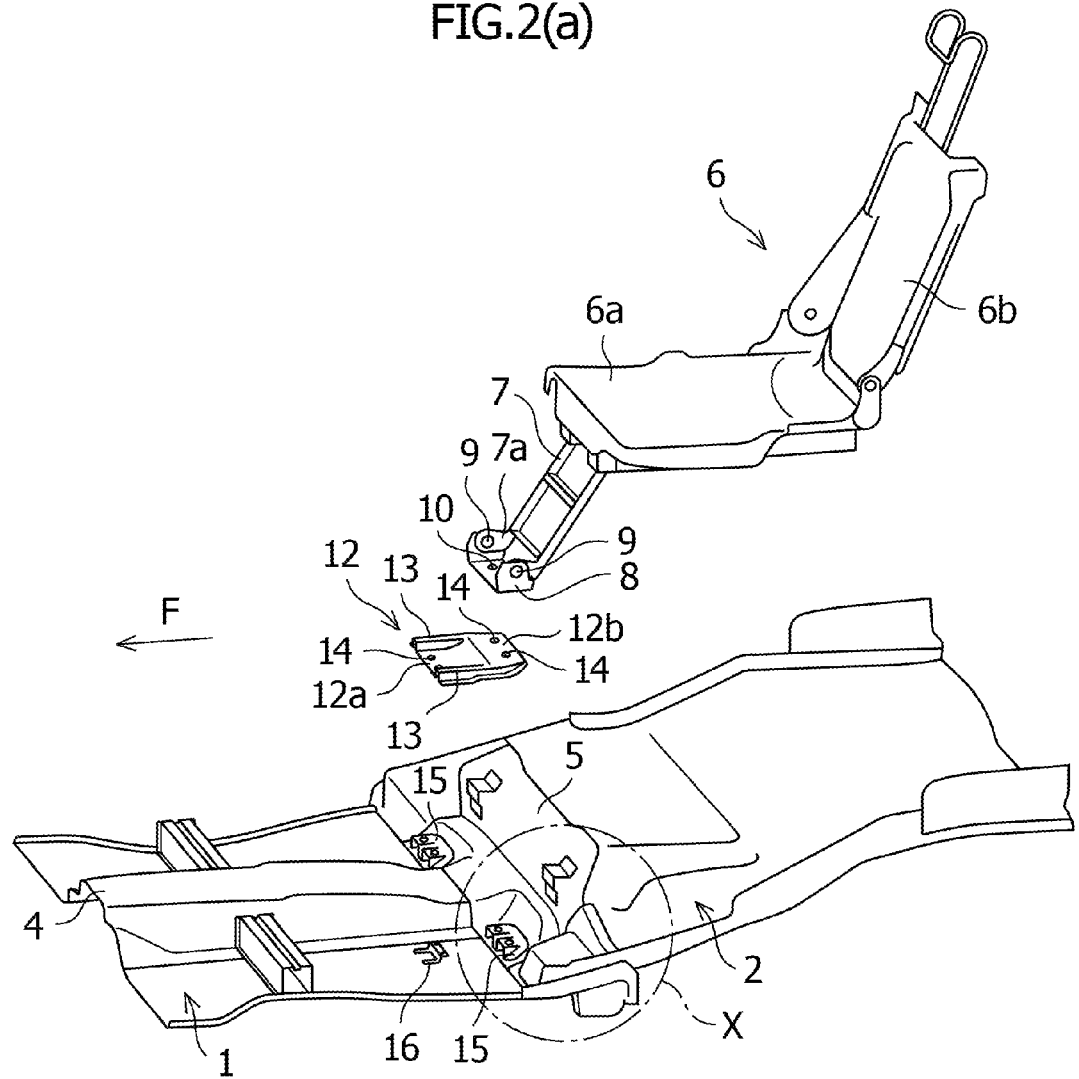
FIG. 2(a) is a perspective view showing a state before the rear seats of FIG. 1 are mounted on the rear floor panel.
Figure 2B:
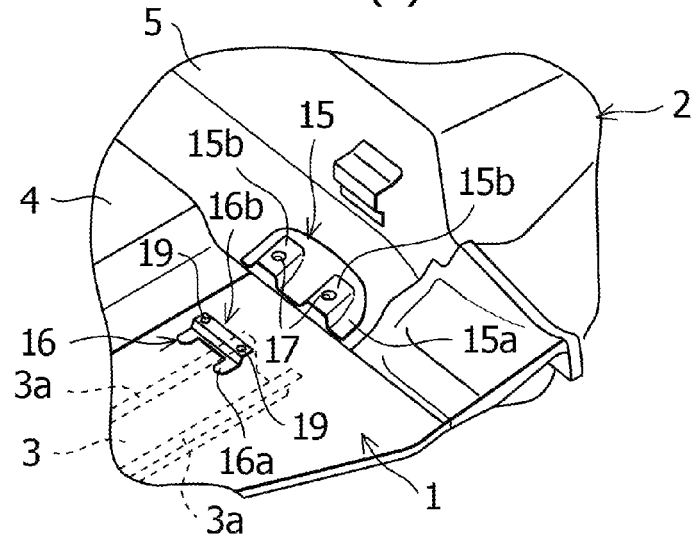
FIG. 2(b) is a perspective view showing an X part of FIG. 2(a) by enlarging the X part.
Figure 3:
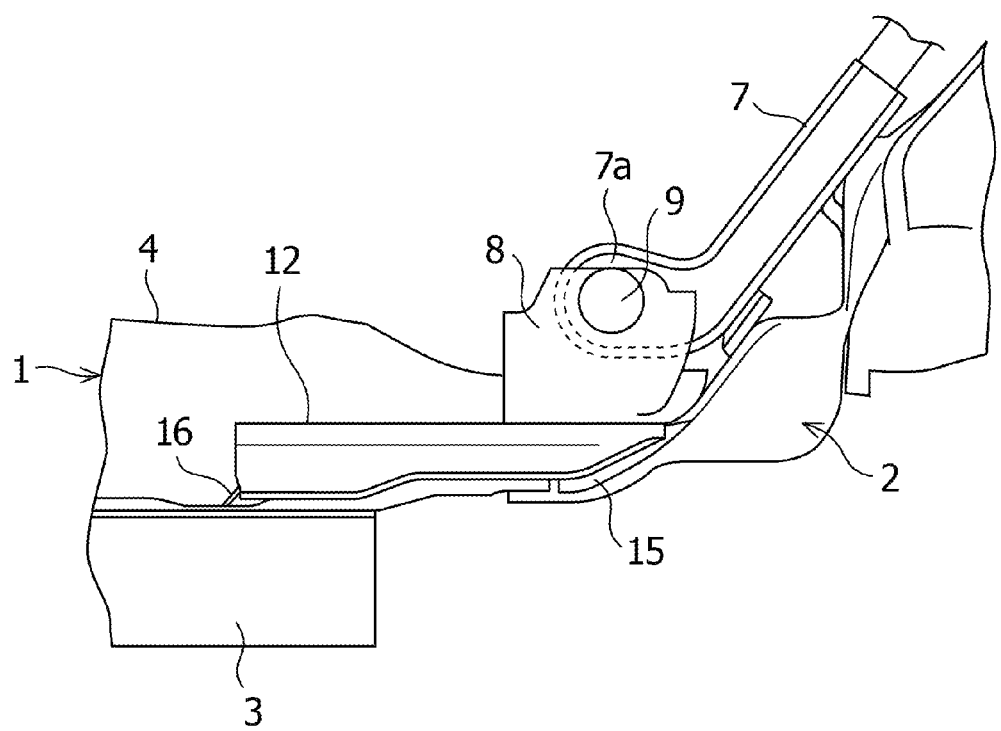
FIG. 3 is a side view showing a vicinity of a mounting portion of the rear seat leg of FIG. 1 by enlarging the vicinity of the mounting portion.

A rear portion of the rear floor panel 2 of the present embodiment is set to be one step higher as compared with the main floor panel 1 by the existence of the vertical wall 5 and the like, and on an upper portion of the rear floor panel 2, a pair of left and right rear seats 6 which are of a separate type are respectively installed, as shown in FIG. 1 and FIG. 2. These rear seats 6 have seat cushions 6a on which passengers sit, and rotatable seat backs 6b that receive backs of the passengers.

Furthermore, at a front side of the rear seat 6, a rear seat leg 7 is provided to extend downward along the vertical wall 5 of the rear floor panel 2 from a lower portion of a front side of the seat cushion 6a, and a lower end portion 7a of the rear seat leg 7 is rotatably mounted to a bottom portion of the front side of the rear floor panel 2 via a support piece 8 with a U-shaped section and pins 9. That is to say, the lower end portion 7a of the rear seat leg is rotatably connected to opposed walls of the support piece 8 by the pins 9. Furthermore, the support piece 8 is fastened and fixed to a rear seat leg reinforcement member and a leg bracket that will be described later by fastening bolts 11 that are inserted in a pair of left and right bolt holes 10 that are provided at a bottom portion.

On upper portions of both left and right sides of the main floor panel 1 and the rear floor panel 2 in the floor structure of the present embodiment, rear seat leg reinforcement members 12 that extend in the vehicle longitudinal direction are respectively disposed as shown in FIG. 1 to FIG. 4, and the rear seat leg reinforcement members 12 are each set to have such a length as to extend from a mounting portion of the rear seat leg 7 to a vicinity of a front side of a rear end portion of the floor side member 3 at the vehicle front side, and to be capable of being superimposed thereon in a vertical direction. A rear end portion 12b of the rear seat leg reinforcement member 12 is connected to the support piece 8 of the rear seat leg 7, and a front end portion 12a of the rear seat leg reinforcement member 12 is connected to the main floor panel 1 and the floor side member 3.

Figure 4A:
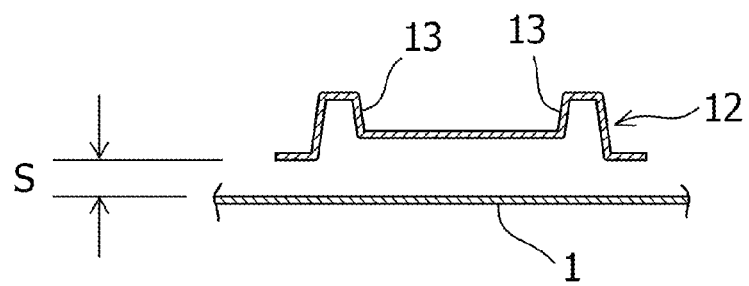
FIG. 4(a) is a sectional view taken along the A-A line in FIG. 1.

Accordingly, the rear seat leg reinforcement member is formed by using one sheet of panel member having substantially the same width as the support piece 8 of the lower end portion 7a of the rear seat leg 7 and front and rear brackets that will be described later, and both left and right side portions in the vehicle width direction are folded downward substantially perpendicularly, while lower end portions thereof are folded outward substantially perpendicularly, whereby the rear seat leg reinforcement member 12 has a hat-shaped section. In addition, at side portions at both the left and right sides in the vehicle width direction of the rear seat leg reinforcement member 12, flange portions 13 that extend along the vehicle longitudinal direction and protrude upward or downward (upward in the present embodiment) are provided as shown in FIG. 2(a) and FIG. 4(a), and by the flange portions 13, the rigidity of the rear seat leg reinforcement member 12 is enhanced, deformation by rising moment is suppressed, and enhancement of the effect of diffusing input load is realized.

Figure 4B:
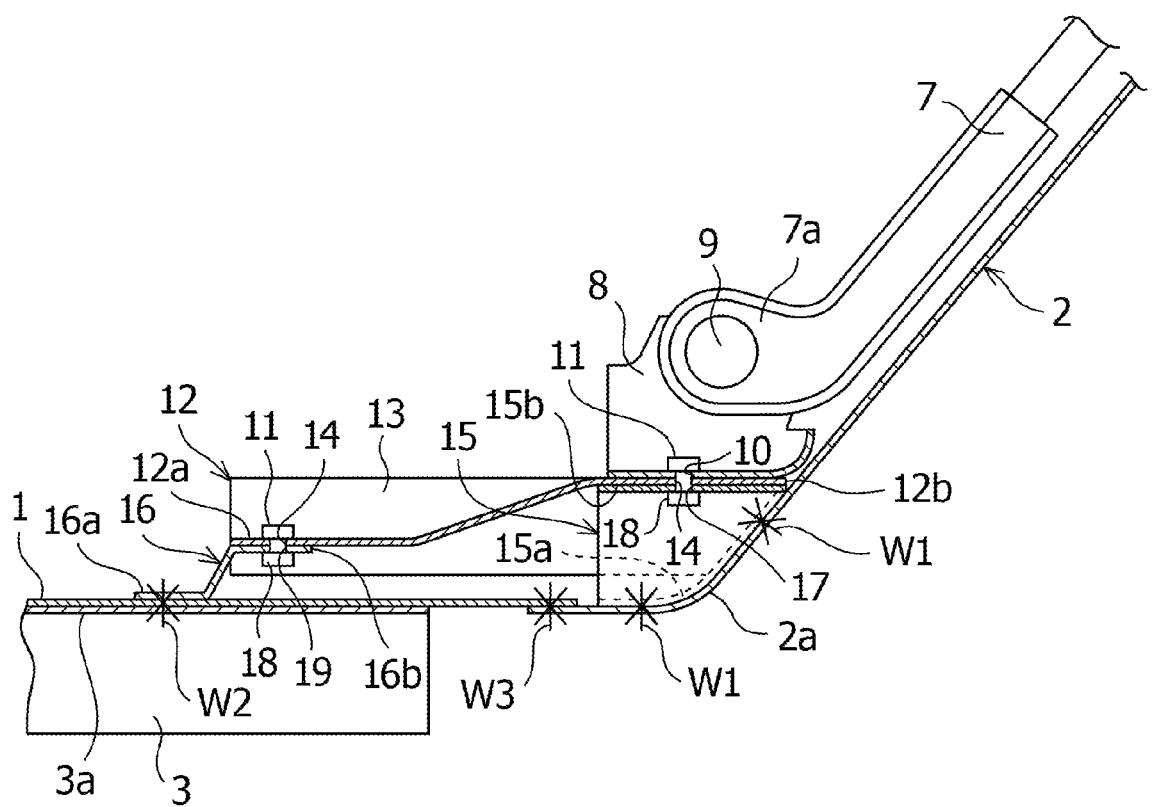
FIG. 4(b) is a sectional view taken along the B-B line in FIG. 1.

The front and rear end portions 12a and 12b of the rear seat leg reinforcement member 12 are formed on a flat surface as shown in FIG. 2(a) and FIG. 4(b), and the rear end portion 12b is formed so that a position in the vertical direction is higher than the front end portion 12a to correspond to a height of the mounting spot. Furthermore, in the front and rear end portions 12a and 12b of the rear seat leg reinforcement member 12, a pair of left and right insertion holes 14 in which the fastening bolts 11 are inserted are respectively bored.

Furthermore, in the floor structure of the present embodiment, the lower end portion 7a of the rear seat leg 7 is mounted on a top surface of the rear floor panel 2 via the rear end portion 12b of the rear seat leg reinforcement member 12 and a leg bracket 15 as shown in FIG. 2 and FIG. 4(b), and the front end portion 12a of the rear seat leg reinforcement member 12 is connected to the main floor panel 1 and the floor side member 3 via a reinforcement member bracket 16.

Therefore, a front side portion of the rear floor panel 2 has a curved portion 2a that is formed into a shape that draws a curve that curves downward continuously from a lower portion of the vertical wall 5 with a front end portion extending in a horizontal direction toward the vehicle front side. On the curved portion 2a of the rear floor panel 2, the leg bracket 15 that has a bottom surface portion 15a formed into a curved shape that is along the curved portion 2a of the rear floor panel 2 is disposed, and is configured such that by the shape of the bottom surface portion 15a of the leg bracket 15, a diagonally downward input load that is transmitted to the mounting portion of the lower end portion 7a of the rear seat leg 7 can be efficiently converted into a rising moment. The bottom surface portion 15a of the leg bracket 15 is joined to a top surface of the curved portion 2a of the rear floor panel 2 by a welding portion W1 of spot welding.

Furthermore, a pair of left and right fastening portions 15b that protrude upward from the bottom surface portion 15a are provided at both left and right side portions in the vehicle width direction of the leg bracket 15, and in these fastening portions 15b, mounting holes 17 through which the fastening bolts 11 are inserted are bored to correspond to the bolt holes 10 of the support piece 8 and the insertion holes 14 of the rear seat leg reinforcement member 12. On a back surface side of the fastening portion 15b corresponding to the mounting hole 17, a welding nut 18 that is screwed onto the fastening bolt 11 is fixedly attached. Accordingly, the lower end portion 7a of the rear seat leg 7 is fastened and fixed to the leg bracket 15 via the support piece 8 and the rear end portion 12b of the rear seat leg reinforcement member 12 by the fastening bolts 11 and the welding nuts 18.

Meanwhile, the reinforcement member bracket 16 is formed by using one sheet of panel member that has the same width as a space between the upper flanges 3a of the floor side member 3, is folded upward at a longitudinally middle portion so that a rear portion 16b is at a position in the vertical direction higher than a front portion 16a to correspond to a height of a mounting spot, and is formed to be substantially crank-shaped in section overall, as shown in FIG. 2 and FIG. 4(b). The front portion 16a of the reinforcement member bracket 16 is formed into a U-shape divided into both left and right sides in plan view, and is joined by a welding portion W2 of spot welding in a state in which the front portion 16a is stacked with the upper flange 3a of the floor side member 3 and the main floor panel 1 in three layers, and enhancement of the welding strength is realized.

Furthermore, in the rear portion 16b of the reinforcement member bracket 16, a pair of left and right mounting holes 19 through which the fastening bolts 11 are inserted are bored to correspond to the insertion holes 14 of the rear seat leg reinforcement member 12. The welding nuts 18 that are screwed onto the fastening bolts 11 are fixedly attached to the back surface side of the rear portion 16b corresponding to the mounting holes 19. Accordingly, the front end portion 12a of the rear seat leg reinforcement member 12 is fastened and fixed to the rear portion 16b of the reinforcement member bracket 16 by the fastening bolts 11 and the welding nuts 18.

That is to say, a clearance S is provided between a vertical space between the rear seat leg reinforcement member 12, and the main floor panel 1 and the rear floor panel 2 in the floor structure of the present embodiment, as shown in FIG. 4(a), and by the rear seat leg reinforcement member 12 which is disposed by being raised by an amount corresponding to the clearance S, the mounting portion of the lower end portion 7a of the rear seat leg 7 is configured to be restrained from rotating to the vehicle front side.

Furthermore, in the floor structure of the present embodiment, a join portion W3 by spot welding of the rear portion of the main floor panel 1 and the front portion of the rear floor panel 2 is located between the leg bracket 15 and the reinforcement member bracket 16, as shown in FIG. 4(b). By the disposition relation like this, enhancement of rigidity of a periphery of the join spot of the main floor panel 1 and the rear floor panel 2 is realized.

As above, in the floor structure of a vehicle body center section according to the embodiment of the present invention, an L-shaped structure in a vehicle side view that is formed by the lower end portion 7a of the rear seat leg 7 and the rear seat leg reinforcement member 12 is included. Therefore, when the load to the vehicle front side is exerted on the upper portion of the rear seat 6 by an impact from the vehicle front side, the load becomes a rising moment and is transmitted to the mounting portion of the rear floor panel 2 via the lower end portion 7a of the rear seat leg 7, the rear seat leg reinforcement member 12 can transmit the moment to the main floor panel 1 and the floor side member 3 at the vehicle front side smoothly and reliably, can absorb and diffuse the moment efficiently, and can reduce the local deformation of the rear floor panel 2 which is located at the mounting portion of the rear seat leg 7. Consequently, according to the floor structure of the embodiment of the present invention, the mounting portion of the rear seat leg 7 can be reliably restrained from rotating to the vehicle front side, and the amount by which the upper portion of the rear seat 6 moves to the vehicle front side can be reduced.

In addition, in the floor structure of the present embodiment, the rear end portion 12b of the rear seat leg reinforcement member 12 is fastened and fixed to the leg bracket 15 which is joined to the rear floor panel 2, the front end portion 12a of the rear seat leg reinforcement member 12 is fastened and fixed to the reinforcement member bracket 16 which is joined to the main floor panel 1, and the clearance S is provided in the vertical space between the rear seat leg reinforcement member 12, and the main floor panel 1 and the rear floor panel 2, whereby the rear seat leg reinforcement member 12 can be mounted to the main floor panel 1 and the rear floor panel 2 quickly and reliably, and the mounting portion of the rear seat leg 7 can be still more restrained from rotating to the vehicle front side.

An embodiment of the present invention has been described above, but the present invention is not limited to the embodiment already described, and it can be variously modified and changed based on the technical concept of the present invention.

For example, in the embodiment already described, the flange portions 13 which protrude upward were provided at the side portions at both the left and right sides of the rear seat leg reinforcement member 12, but the flange portions 13 which protrude downward may be provided. Furthermore, in place of the flange portions 13 at both the left and right sides, the entire rear seat leg reinforcement member 12 may be formed into a hat shape or a U-shape in section which protrudes upward or downward.

LIST OF PART NUMBERS 1 main floor panel
2 rear floor panel
2a curved portion
3 floor side member
3a upper flange
4 floor tunnel
5 vertical wall of the rear floor panel
6 rear seat
7 rear seat leg
7a lower end portion of the rear seat leg
8 support piece
9 pin
10 bolt hole
11 fastening bolt
12 rear seat leg reinforcement member
12a front end portion
12b rear end portion
13 flange portion
14 insertion hole
15 leg bracket
15a bottom surface portion
15b fastening portion
16 reinforcement member bracket
16a front portion
16b rear portion
17 mounting hole
18 welding nut
19 mounting hole
W1 to W3 welding portion
S clearance

The invention claimed is:

1. A floor structure of a vehicle body center section comprising a main floor panel and a rear floor panel that are provided along a vehicle longitudinal direction, wherein the rear floor panel is joined to a rear portion of the main floor panel, a floor side member that extends in the vehicle longitudinal direction is provided at each of lower portions at both left and right sides of the main floor panel, a vertical wall that extends upward is formed at a front side of the rear floor panel, a rear seat is installed on an upper portion of the rear floor panel, a rear seat leg extends downward along the vertical wall of the rear floor panel from a lower portion of a front side of the rear seat, and a lower end portion of the rear seat leg is mounted to a bottom portion of the front side of the rear floor panel, characterized in that
   a rear seat leg reinforcement member that extends in the vehicle longitudinal direction is disposed on an upper portion at both left and right sides of the main floor panel and on an upper surface of the bottom portion of the rear floor panel, a rear end portion of the rear seat leg reinforcement member is connected to the lower end portion of the rear seat leg, and a front end portion of the rear seat leg reinforcement member is connected to the main floor panel and the floor side member,
   wherein the lower end portion of the rear seat leg is mounted on a top surface of the rear floor panel via the rear end portion of the rear seat leg reinforcement member and a leg bracket, and the front end portion of the rear seat leg reinforcement member is connected to the main floor panel and the floor side member via a reinforcement member bracket.

2. The floor structure of a vehicle body center section according to claim 1, characterized in that a front side portion of the rear floor panel is formed into a shape that draws a curve that curves downward continuously from a lower portion of the vertical wall with a front end portion extending in a horizontal direction toward a vehicle front side, the leg bracket with a bottom surface portion being formed into a curved shape that is along a curved portion of the rear floor panel is disposed on the curved portion of the rear floor panel, and a join spot of the main floor panel and the rear floor panel is located between the leg bracket and the reinforcement member bracket.

3. The floor structure of a vehicle body center section according to claim 1, characterized in that a clearance is provided in a vertical space between the rear seat leg reinforcement member, and the main floor panel and the rear floor panel.

4. The floor structure of a vehicle body center section according to claim 1, characterized in that a flange portion that extends along the vehicle longitudinal direction, and protrudes upward or downward is provided at a side portion in a vehicle width direction of the rear seat leg reinforcement member.

5. The floor structure of a vehicle body center section according to claim 2, characterized in that a clearance is provided in a vertical space between the rear seat leg reinforcement member, and the main floor panel and the rear floor panel.

6. The floor structure of a vehicle body center section according to claim 2, characterized in that a flange portion that extends along the vehicle longitudinal direction, and protrudes upward or downward is provided at a side portion in a vehicle width direction of the rear seat leg reinforcement member.

7. The floor structure of a vehicle body center section according to claim 3, characterized in that a flange portion that extends along the vehicle longitudinal direction, and protrudes upward or downward is provided at a side portion in a vehicle width direction of the rear seat leg reinforcement member.

8. The floor structure of a vehicle body center section according to claim 5, characterized in that a flange portion that extends along the vehicle longitudinal direction, and protrudes upward or downward is provided at a side portion in a vehicle width direction of the rear seat leg reinforcement member.

\* \* \* \* \*